United States Patent
Bolkhovitin et al.

(10) Patent No.: US 11,275,615 B2
(45) Date of Patent: *Mar. 15, 2022

(54) DATA PROCESSING OFFLOAD USING IN-STORAGE CODE EXECUTION

(71) Applicant: Western Digital Technologies, Inc., San Jose, CA (US)

(72) Inventors: Vladislav Bolkhovitin, San Jose, CA (US); Siva Munnangi, San Jose, CA (US); Adam Roberts, Moncure, NC (US)

(73) Assignee: Western Digital Technologies, Inc., San Jose, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/739,064

(22) Filed: Jan. 9, 2020

(65) Prior Publication Data

US 2020/0142740 A1 May 7, 2020

Related U.S. Application Data

(63) Continuation of application No. 15/832,728, filed on Dec. 5, 2017, now Pat. No. 10,565,014.

(51) Int. Cl.
*G06F 9/50* (2006.01)
*G06F 8/41* (2018.01)
*G06F 8/52* (2018.01)

(52) U.S. Cl.
CPC .............. *G06F 9/50* (2013.01); *G06F 8/41* (2013.01); *G06F 8/52* (2013.01)

(58) Field of Classification Search
None
See application file for complete search history.

(56) References Cited

U.S. PATENT DOCUMENTS 8,566,502 B2  10/2013  Vaghani
8,819,335 B1  8/2014  Salessi et al.
(Continued)

FOREIGN PATENT DOCUMENTS

KR  102016003485 A  1/2016
WO  2013016737 A1  1/2013

OTHER PUBLICATIONS

Newburn et al. "Offload Compiler Runtime for the Intel® Xeon Phi™ Coprocessor", 2013 IEEE, pp. 1213-1224.*
(Continued)

*Primary Examiner* — Van H Nguyen
(74) *Attorney, Agent, or Firm* — Patent Law Works LLP

(57) ABSTRACT

Systems and methods for offloading data processing tasks using in-storage code execution are disclosed. For example, a data storage system including one or more processors, a non-transitory storage medium, and a storage logic executable by the one or more processors to perform operations including: receiving portable code configured to perform a data processing offload task, the portable code comprising one or more translatable, hardware-agnostic instructions for processing data stored on the storage medium; translating and executing the one or more translatable, hardware-agnostic instructions of the portable code to perform the data processing offload task using a translation and execution engine disposed in the storage logic; determining that use of the portable code has concluded; and responsive to determining that use of the portable code has concluded, releasing the portable code.

18 Claims, 7 Drawing Sheets

(56) References Cited

U.S. PATENT DOCUMENTS

| | | | |
|---|---|---|---|
| 8,959,067 B1 | 2/2015 | Patiejunas et al. | |
| 8,990,455 B1* | 3/2015 | Owen | G06F 13/10 |
| | | | 710/36 |
| 10,565,014 B2* | 2/2020 | Bolkhovitin | G06F 8/52 |
| 2005/0246443 A1 | 11/2005 | Yao et al. | |
| 2008/0163183 A1* | 7/2008 | Li | G06F 8/456 |
| | | | 717/149 |
| 2009/0064095 A1 | 3/2009 | Wallach et al. | |
| 2009/0276771 A1 | 11/2009 | Nickolov et al. | |
| 2013/0159980 A1 | 6/2013 | Braude | |
| 2014/0032691 A1 | 1/2014 | Barton et al. | |
| 2014/0325495 A1* | 10/2014 | Ravi | G06F 8/452 |
| | | | 717/150 |
| 2015/0032938 A1 | 1/2015 | Salessi | |
| 2015/0046679 A1 | 2/2015 | Gathala et al. | |
| 2015/0358411 A1 | 12/2015 | Kruglick | |
| 2015/0378932 A1 | 12/2015 | Souri et al. | |
| 2016/0092279 A1 | 3/2016 | Lee et al. | |
| 2017/0353397 A1* | 12/2017 | Che | H04L 67/10 |

OTHER PUBLICATIONS

Lee et al. "Architecture-aware Automatic Computation Offload for Native Applications", 2015 ACM, pp. 521-532.*
Martin, Storage Intelligence in SSDs and Standards, Storage Developer Conference, Santa Clara, 2015 (17 pages).
The Principles Behing ZeroVM, Retrieved from http://www.zerovm.org/principles.html, Dec. 17, 2014 (1 page).
Yee, et al., Native Client: A Sandbox for Portable, Untrusted x86 Native Code, Security and Privacy,30th IEEE Symposium, IEEE, 2009 (15 pages).
International Preliminary Report on Patentability of Application No. PCT/US2018/052505, dated Jun. 18, 2020 (10 pages).
International Search Report and Written Opinion of Application No. PCT/US2018/052505, dated Jan. 16, 2019 (15 pages).

* cited by examiner

DATA PROCESSING OFFLOAD USING IN-STORAGE CODE EXECUTION

CROSS REFERENCE TO RELATED APPLICATIONS

The present application is a continuation of and claims priority to U.S. application Ser. No. 15/832,728, entitled "Data Processing Offload Using In-Storage Code Execution," filed Dec. 5, 2017, which is incorporated by reference in its entirety.

BACKGROUND

The present disclosure relates to systems and methods for distributed data processing. In particular, the present disclosure relates to methods for offloading data processing tasks using in-storage code execution.

There are many applications that require data processing of some kind, for example, scanning a data set looking for some pattern, data sorting, index building, data compaction, etc. These include "Big Data" applications involving MapReduce tasks. Host devices executing such applications may be required to read the whole data set from the storage device for data processing and then write the newly generated resulting dataset back to storage after the data processing is completed. Such activities can often generate a lot of traffic on the bus or network between the host and storage, unnecessarily burden the host, and consume a significant amount of power.

A current approach for overcoming the above problems can include offloading the data processing tasks from the host device to the storage device. In this approach, the host compiles the source code for the data processing task and sends the resulting compiled binary code to the storage device to be executed inside the storage device. However, this approach for offloading data processing tasks to the storage device suffers from a number of drawbacks. First, the data processing task can be offloaded to only a limited range of storage devices having specific hardware architectures that are compatible with the compiled binary code. Second, the binary code sent from the host to the storage device may be vulnerable to security issues requiring the use of complicated and resource-intensive measures (e.g., tunneling, containers) on the storage device to protect the integrity of the data processing task. Third, the data processing task may not run optimally on the storage device due to the inability to account for the real-time operating conditions that may occur on the storage device during execution.

Thus, there is a need for a method and system that, for example, offloads data processing tasks onto storage systems in a flexible, secure, and resource efficient way that provides optimal performance.

SUMMARY

The present disclosure relates to systems and methods for offloading data processing tasks using in-storage code execution.

According to one innovative aspect, a data storage system including one or more processors, a non-transitory storage medium, and a storage logic executable by the one or more processors to perform operations including: receiving portable code configured to perform a data processing offload task, the portable code comprising one or more translatable, hardware-agnostic instructions for processing data stored on the storage medium; translating and executing the one or more translatable, hardware-agnostic instructions of the portable code to perform the data processing offload task using a translation and execution engine disposed in the storage logic; determining that use of the portable code has concluded; and responsive to determining that use of the portable code has concluded, releasing the portable code.

According to another innovative aspect, a method including receiving portable code configured to perform a data processing offload task, the portable code comprising one or more translatable, hardware-agnostic instructions for processing data stored on a non-transitory storage medium; translating and executing the one or more translatable, hardware-agnostic instructions of the portable code to perform the data processing offload task using a translation and execution engine disposed on the data storage system; determining that use of the portable code has concluded; and responsive to determining that use of the portable code has concluded, releasing the portable code.

According to yet another innovative aspect, a data storage system including one or more processors, a non-transitory storage medium, means for receiving portable code configured to perform a data processing offload task, the portable code comprising one or more translatable, hardware-agnostic instructions for processing data stored on the storage medium, means for translating and executing the one or more translatable, hardware-agnostic instructions of the portable code to perform the data processing offload task, means for determining that use of the portable code has concluded, and means for releasing the portable code responsive to determining that use of the portable code has concluded.

These and other implementations may each optionally include one or more of the following features: that the translating and executing the one or more translatable, hardware-agnostic instructions comprises individually and sequentially executing each of the one or more translatable, machine-agnostic instructions of the portable code using an interpreter in the translation and execution engine; that the one or more translatable, machine-agnostic instructions of the portable code comprise source code instructions; that the one or more translatable, machine-agnostic instructions of the portable code comprise bytecode instructions, and the bytecode instructions are specifically configured to perform data processing offload tasks; that the translating and executing the one or more translatable, hardware-agnostic instructions comprises compiling the one or more translatable, machine-agnostic instructions of the portable code into machine code native to the data storage system using a compiler in the translation and execution engine, and executing the machine code; that the portable code comprises a procedure configured to perform the data processing offload task; that the operations performed by the storage logic further comprise determining a portable code type, selecting a translator in the translation and execution engine based on the determined portable code type, and translating the translatable, hardware-agnostic instructions of the portable code using the selected translator; that the translating and executing the one or more translatable, hardware-agnostic instructions comprises determining a present operating condition of the data storage system, determining whether to perform a certain action during translating and executing based on the determined present operating condition of the data storage system, and translating and executing the one or more translatable, hardware-agnostic instructions in a corresponding manner that optimizes a performance of the data processing offload task by the data storage system; that the portable code for performing the data processing offload task is stored on the data storage system in a precompiled format; that the data processing offload task comprises performing one of a MapReduce, counting, filtering, compaction, and encryption type of operation on one or more items of the data stored on the non-transitory storage medium; that the one or more processors comprise one or more programmable integrated circuits that execute one or more of the operations of the storage logic; that the data storage system further comprises a storage device comprising the one or more processors, the non-transitory storage medium, and the storage logic, and a host system coupled to the storage device, the host system comprising one or more second processors and second logic executable by the one or more second processors to perform operations comprising loading the portable code into the storage device for translation and execution by the storage device, detecting completion of the translation and execution of the portable code by the storage device, and unloading the portable code from the storage device.

The various aspects of the novel technology described herein, which include the various systems, methods, devices, non-transitory storage media, computer-implemented software, and other aspects include several innovative technical features and advantages, including, but not limited to: (1) increased performance and reduced power consumption of the data processing system, (2) portability of the data processing tasks, and (3) improved security in the execution of the data processing tasks.

For instance, the technology may increase the performance and reduce power consumption of the data processing system through the efficient and optimized use of system resources in performing the data processing tasks. Some embodiments may take advantage of internal resources and bandwidth of the storage device that are generally underutilized during data processing by existing data processing systems. For instance, solid state drives (SSDs) typically have an internal bandwidth that is two or more times larger than externally available bandwidth, such that they can perform internal garbage collection activities more efficiently. Thus, if data processing tasks are offloaded into the storage device, performance of those tasks could be increased by a factor of two times or more. Further, by offloading the data processing task data traffic could be greatly decreased from the bus or network between the host and storage device, thereby further increasing overall performance, since in many data center environments network bandwidth is the primary performance limiting factor. For example, in "Big Data" applications for MapReduce types of loads the whole Map phase could be fully offloaded into the storage device. In some cases, the Shuffle/Reduce phases also could be at least partially offloaded. The reduction of data traffic may have the added benefit of reducing power consumption of the data processing system.

Further, the technology may increase the performance of the data processing system by balancing the execution of the offloaded data processing tasks against other activities concurrently being performed by the storage device, as explained in further detail below.

In some cases, the technology can provide portability of the data processing tasks such that they can be offloaded to a variety of different storage platforms and devices. Portability of the data processing tasks may be achieved by offloading the data processing procedure in the form of portable code (e.g., source code or bytecode) that can be readily ported to a variety of hardware platforms for execution.

Additionally, the technology may provide improved security in the execution of the data processing tasks by verifying that the received source code and/or bytecode in the offloaded data processing procedure do not violate defined security rules before being executed.

Other implementations of one or more of these aspects include corresponding systems, apparatus, and computer programs, configured to perform the actions of the methods, encoded on computer storage devices. It should be understood that language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Novel data processing technology, such as but not limited to systems, devices, and methods for offloading data processing tasks using in-storage code execution are disclosed. While this technology is described below in the context of a particular system architecture in various cases, it should be understood that the systems and methods can be applied to other architectures and organizations of hardware.

Figure 1:
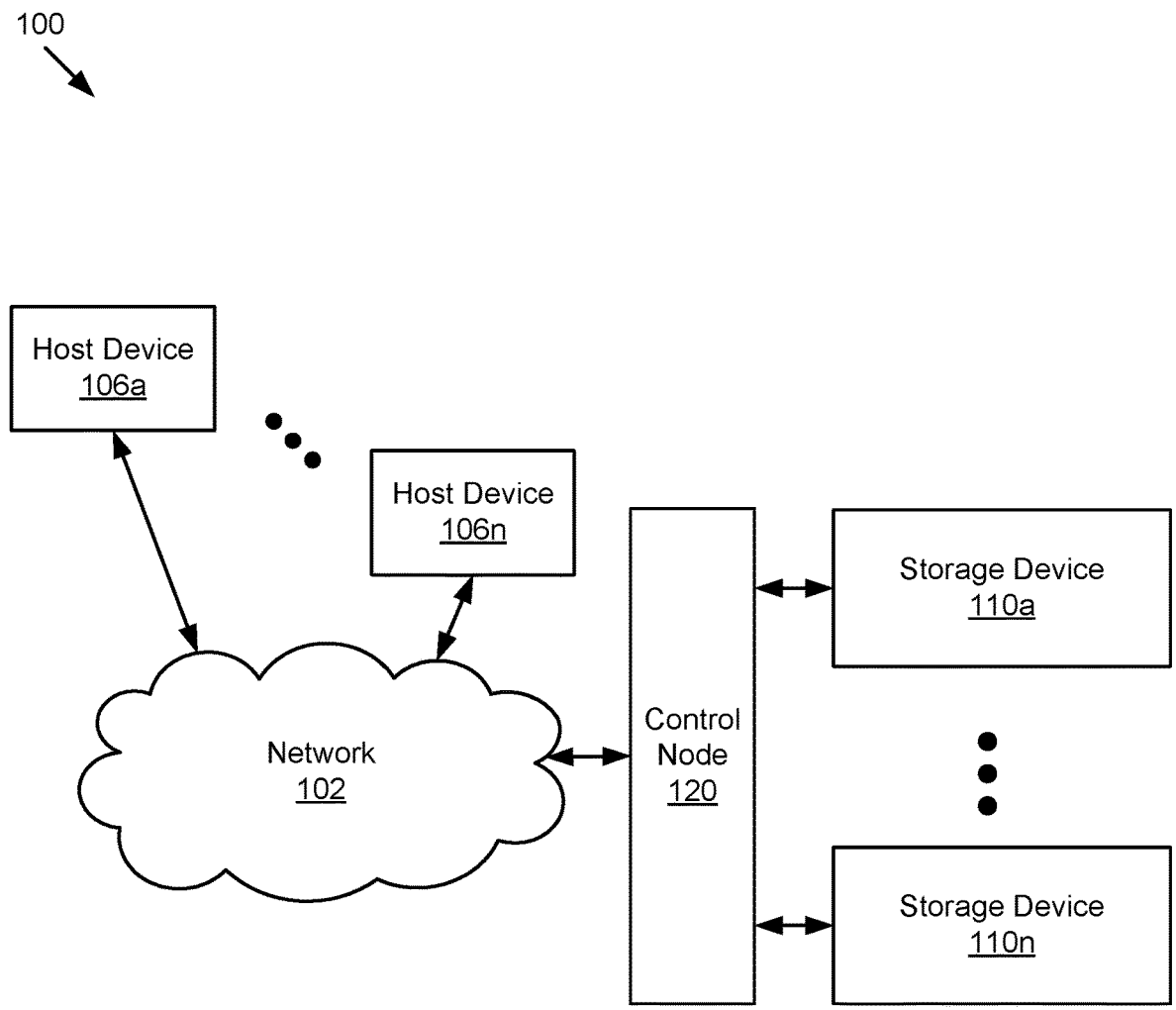
FIG. 1 is a block diagram of an example data processing system.

With reference to the drawings, FIG. 1 is a block diagram of an example data processing system 100. As shown, the data processing system 100 can include, among other components, one or more host devices 106a, . . . , 106n, one or more storage devices 110a, . . . , 110n, a network 102, and optionally, a control node 120.

A host device 106 can include any computer (e.g., a server or client) known or developed in the future that is capable of performing data processing tasks and accessing the storage device(s) 110 via the network 102. By way of example and not limitation, the host device may include one or more hardware servers, server arrays, storage devices and/or systems, etc., and/or may be centralized or distributed/cloud-based. In some embodiments, the host device 106 may include one or more virtual servers, which operate in a host server environment and access the physical hardware of the host server including, for example, a processor, memory, storage, network interfaces, etc., via an abstraction layer (e.g., a virtual machine manager).

As explained in more detail below, the host device 106 may execute various software programs such as system software (e.g., operating systems, compilers, and drivers), applications, etc. The host device 106, as part of its respective operation, may rely on sending input/output (I/O) requests to storage device(s) 110 to write data, read data, and/or modify data, etc. For instance, the host device 106 can transmit I/O requests to write, read, store, communicate, propagate, and/or transport instructions, data, computer programs, software, code, routines, etc., to storage device(s) 110. Storage device(s) 110 can be accessed by host device(s) 106 and/or communication with storage device(s) 110 can be initiated by host device(s) 106 through a network socket (not shown) utilizing one or more inter-process networking techniques, although other suitable communication configurations and/or protocols are also possible, applicable, and contemplated. In some embodiments, host device(s) 106 and storage device(s) 110 may comprise at least a portion of a client-server model.

A storage device 110 is a data storage system that may store information on any type of writable storage media, such as storage class memory (e.g., magneto-resistive random-access memory (MRAM), phase change memory (PCM), resistive random-access memory (ReRAM)), flash memory (i.e., SSD), magnetic disks (i.e., HDD), optical disks, random-access memory (RAM), magnetic tape, and/ or any other similar media adapted to store information, including software programs, data and parity information. The storage device 110 may include one or more non-transitory computer-readable media for storing data.

The network 102 may be a wired or wireless computer network, such as a local area network (LAN), a wide area network (WAN) (e.g., Internet, intranet, a cloud network, etc.), cellular network, and/or other interconnected data paths across which the host device(s) 106, storage device(s) 110, and various other devices in the data processing system 100 may communicate. The network 102 may have numerous different configurations including a bus configuration, a star configuration, token ring configuration, or other configurations. In some embodiments, the network 102 may be a peer-to-peer network.

Data may be transmitted via the network 102 using various wired or wireless network protocols, interfaces and/or other technologies including Transmission Control Protocol/Internet Protocol (TCP/IP), User Datagram Protocol (UDP), Hypertext Transfer Protocol (HTTP), Dynamic Adaptive Streaming over HTTP (DASH), Real-Time Streaming Protocol (RTSP), Real-Time Transport Protocol (RTP), RTP Control Protocol (RTCP), Voice over Internet Protocol (VoW), File Transfer Protocol (FTP), Web Socket (WS), Wireless Access Protocol (WAP), Universal Serial Bus (USB), IEEE 1394, Integrative Drive Electronics (IDE), Enhanced IDE (EIDE), Serial Advanced Technology Attachment (SATA), Small Computer System Interface (SCSI), Internet Small Computer Systems Interface (iSCSI), Serial Attached SCSI (SAS), PCI Express (PCIe), Fibre Channel, Remote Direct Memory Access (RDMA), Non-Volatile Memory Express (NVMe), NVMe over Fabric (NVMe-oF), or other standard or proprietary protocols, interfaces and/or technologies currently available or available in the future.

Although the example of FIG. 1 illustrates a single network 102, in practice multiple networks 102 can connect the entities of the system 100. The network 102 may also be coupled with or include portions of a telecommunications network for sending data using a variety of different communication protocols.

In some embodiments, the data processing system 100 may include control node 120, which is a device that coordinates and controls the flow of data between the storage device(s) 110 and with other devices connected to the network 102 such as host device(s) 106. For example, the control node 120 may act as a high-performance interconnect that forms a tightly coupled cluster comprising the storage devices 110, although other suitable roles are also possible and contemplated.

It should be understood that the data processing system 100 is not limited to the configuration shown in FIG. 1, and a variety of different and/or modified system environments and configurations may be employed and are within the scope of the present disclosure. Further embodiments may include additional or fewer computing devices, services and/or networks.

Figure 2:
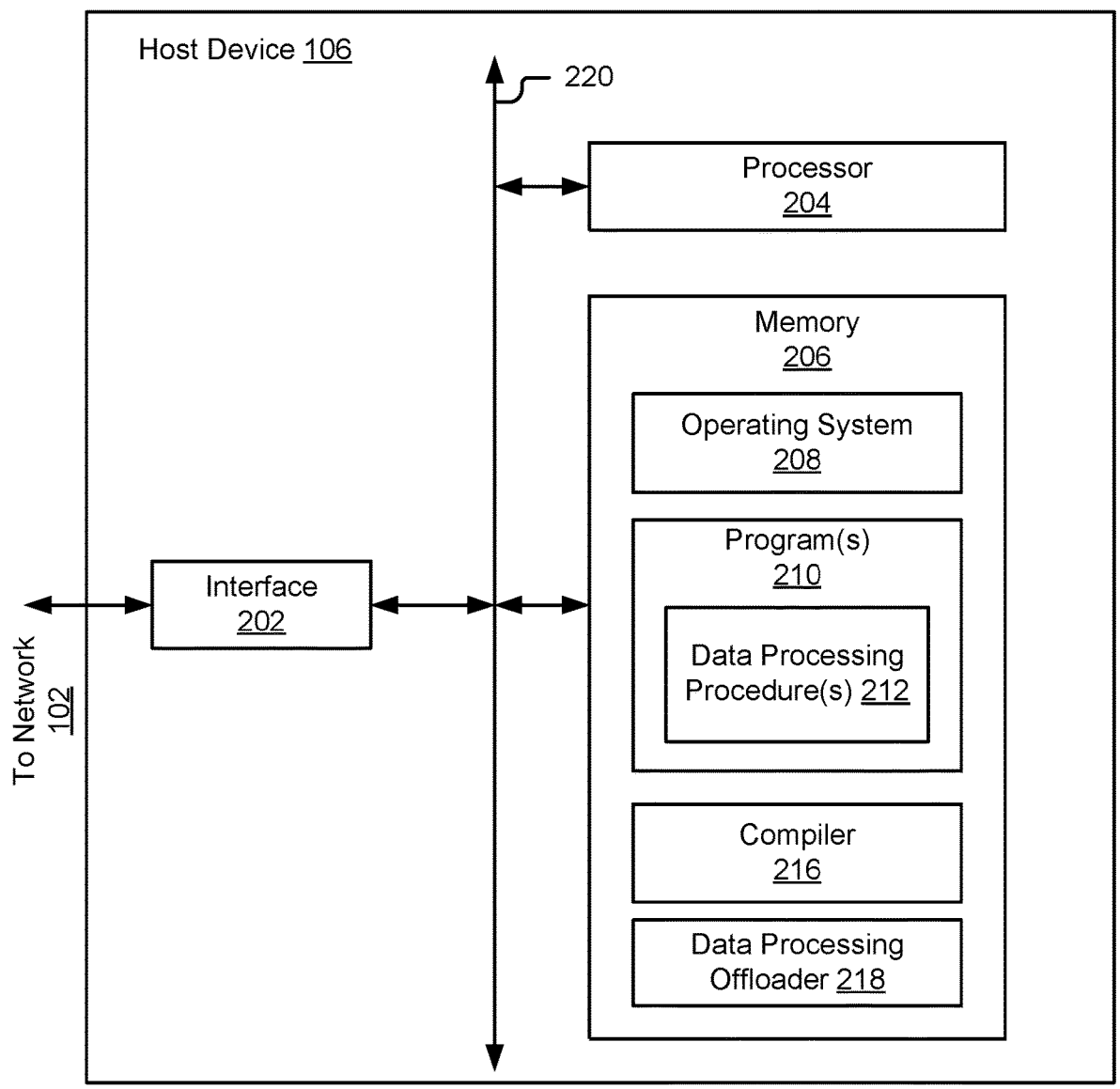
FIG. 2 is a block diagram of an example host device included in the data processing system of FIG. 1.

FIG. 2 is a block diagram of an example host device 106 included in the data processing system 100 of FIG. 1. As shown, the host device 106 may comprise, among other components, an interface 202, a processor 204, and a memory 206 for storing software and data, including an operating system 208, one or more programs 210, a compiler 216 (optional), and a data processing offloader 218. The components of the host device 106 including the interface 202, the processor 204, and the memory 206 are coupled to each other using a bus 220. The bus 220 is used to transfer data between these components.

The interface 202 couples the host device 106 to the network 102. For instance, the interface 202 may include, but is not limited to, input/output (I/O) interface circuitry that couples with an interface 302 of the storage device 110 for sending and receiving data using the protocols described above regarding the network 102.

The processor 204, which may include one or more processors, may be used to execute the instructions of various software programs contained in the memory 206. The processor 204 may include one or more arithmetic logic units, microprocessors, general-purpose controllers, programmable integrated circuits such as application-specific integrated circuits (ASICs) or field-programmable gate arrays (FPGAs), or some combination thereof, to execute instructions stored in the memory 206. The processor 204 may be physical or virtual, and may include a single processing unit or a plurality of processing units and/or cores. The processor 204 may be based on various computing architectures including a complex instruction set computer (CISC) architecture, a reduced instruction set computer (RISC) architecture, or an architecture implementing a combination of instruction sets. It should be understood that other configurations of the processor 204 are possible.

The memory 206, which may include one or more non-transitory storage devices, may store software programs and/or data that are executed by the processor 204, including the operating system 208, the program(s) 210, the compiler 216, and the data processing offloader 218. The memory 206 may comprise, for example, volatile memory such as dynamic random access memory (DRAM) device(s), static random access memory (SRAM) device(s), non-volatile memory such as electrically erasable programmable read-only (EEPROM) or flash memory devices, a combination of the foregoing, and/or some other suitable type of data storage medium.

The operating system 208 may comprise software, such as system software, that manages the various hardware and software resources in the host device 106. The operating system 208 may include any commercially available or special purpose operating system such as a UNIX®-based OS (e.g., LINUX®), Microsoft Windows®, Mac OS®, etc., a custom operating system, or any other suitable control system that manages hardware and/or software resources, and/or provides services to devices and/or executable programs.

A program 210 may comprise software, such as system software (e.g., a device driver) or application software (e.g., a "Big Data" data mining or analytics program), that performs operations on the host device 106. In some cases, various different program(s) 210 may be executed on the host devices 106 or provide various different functionality and/or services. A program 210 may include source code, scripts, object code, or other collections of computer instructions to be executed by the processor 204. In some embodiments, one or more programs 210 may encompass multiple processes that each may be made up of multiple threads of execution that can be active at any given time in the system 100. In some embodiments, a program 210 may comprise source code comprising of a set of instructions in a high-level language (e.g., C++, Java®, Python®, etc.) to perform data processing tasks such as processing data stored on the storage device 110.

A program 210 may include one or more data processing procedures 212 for performing respective data processing tasks to be offloaded to the storage device 110 for execution. A data processing procedure 212 includes software created (e.g., written) in a high-level language by a user of the program 210 running on the host device 106 to offload specific desired data processing tasks or functions in the program 210 for execution by the storage device 110. For example, the data processing offload tasks may include scanning a data set looking for some pattern, data sorting, data filtering, index rebuilding, and data compaction. In some embodiments, artificial intelligence techniques may be used to automatically generate the data processing procedure 212.

In some embodiments, an example data processing procedure 212 as originally created comprises source code in a high-level language. The high-level language is of a type suitable for defining data processing tasks for processing data stored on a storage system such as storage device 110.

Figure 5:
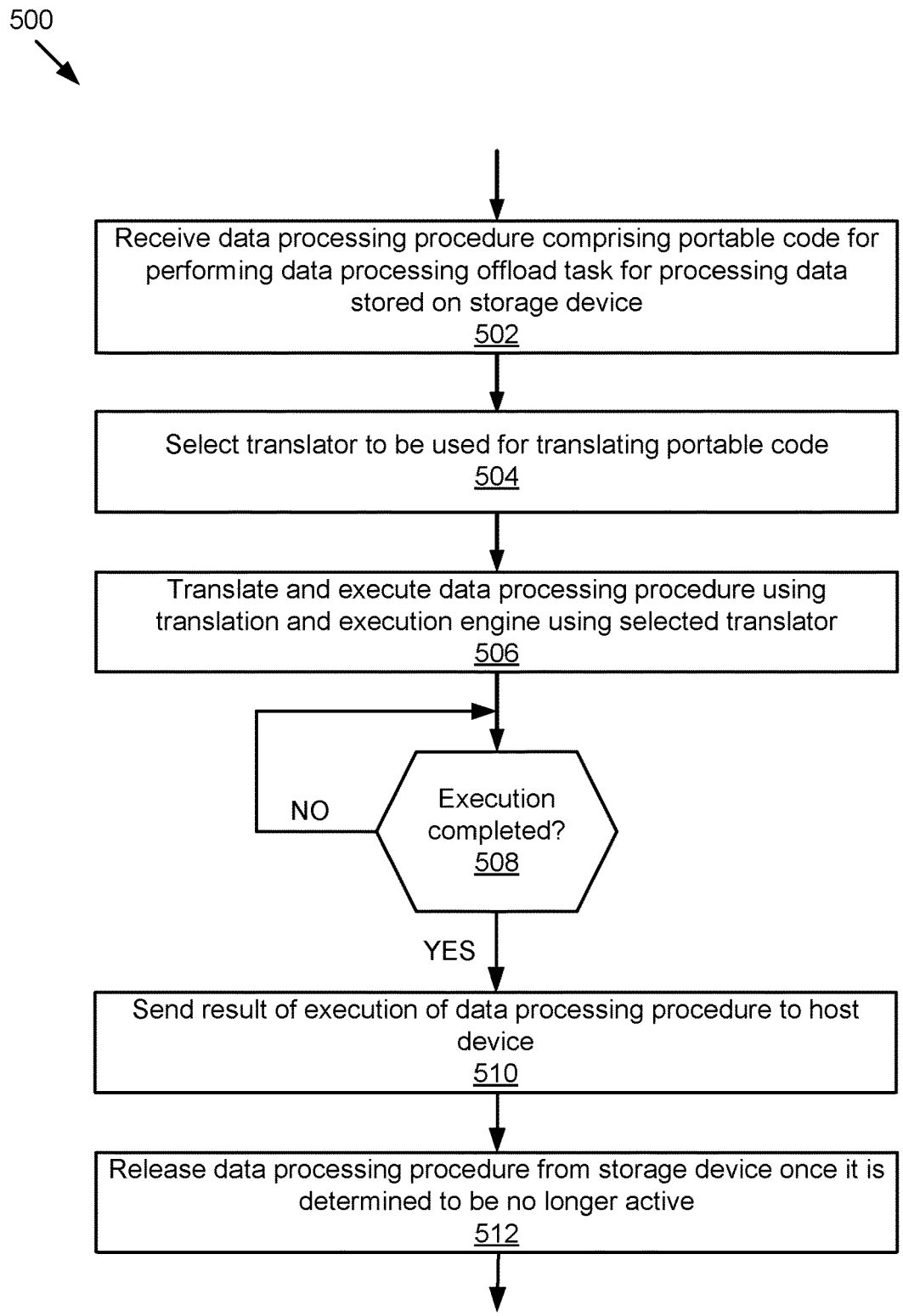
FIG. 5 is a flowchart of an example method for performing data processing offload by the storage device of FIG. 3.

Two examples of the data processing procedure 212 associated with an example program 210 are shown below:

1)  An application program 210 needs to find out the number of
    records containing the word "cat" in the
    data set, located in the specified set of blocks:
        i = 0
        for each block $B in $S
            for each word $W in $B
                if $W = "cat" then
                    i += 1
            done
        done
        return i
2)  An application program 210 needs to filter a dataset to only
    those records containing the word "cat":
        for each block $B in $S
            for each record $R in $B
                if $R contains "cat" then
                    write $R to $D
            done
        done As described in more detail with respect to FIG. 5 below, the data processing procedure 212 is sent from the host device 106 to the storage device 110 for execution in either source code or bytecode form, depending on the embodiment. Source code is written in a high-level programming language that typically uses a human-readable language (e.g., English) and mathematical symbols (e.g., +, −, %) in its instructions. However, source code needs to be eventually translated into machine code for execution by a computer.

By contrast, bytecode is an intermediate level computer language that, unlike human-readable source code, is generally composed of compact numeric codes, constants, and references (e.g., numeric addresses) that encode the result of compiler parsing and semantic analysis of type, scope, nesting depths of program objects, etc. Thus, typically bytecode can be interpreted and executed by a computer more efficiently and with significantly better performance than source code.

In the present disclosure, source code and bytecode are generally referred to as "portable code," in which the portable code comprises one or more translatable, hardware-agnostic instructions. Source code and bytecode are considered "portable" (e.g., platform independent, executable in different operating environments, etc.) because they can be readily ported to a variety of hardware platforms for execution. By contrast, binary code (e.g., machine code) is unportable because it is executable only by the specific hardware platform that it is compiled for.

The exact form of the data processing procedure 212 sent to the storage device 110 may vary depending on what is necessary to achieve best performance for the specific configuration of the storage device 110. In some embodiments, there may be only one form of data processing procedure 212 in the program 210. In other embodiments, there may be more than one form of data processing procedure in the program 210, in which each of the different forms may be offloaded to the same or different storage device(s) 110 associated with the host device 106.

As described in more detail with respect to FIG. 4 below, the compiler 216 is used to compile the data processing procedure 212 from source code to bytecode format in preparation for offloading to storage device 110. The compiler 216, which comprises software that translates computer code written in one programming language into another computer language, compiles the source code of the data processing procedure 212 into bytecode for offloading to the storage device 110. The bytecode language that the data processing procedure 212 is compiled to may be a commercially available bytecode language, such as Java bytecode, or may be a bytecode language that is specifically designed for the purpose of offloading a data processing task to a data storage device. Other bytecode variations are also possible and contemplated. While the embodiment shown in FIG. 2 depicts the compiler 216 as being located in the host device 106, in further embodiments the compiler may be located in another device connected to the host device 106 via the network 102.

The compiler 216 may comprise different types depending on its purpose and the platform that the compiler works on. In some embodiments, the compiler 216 may perform various operations including preprocessing lexical analysis, parsing, semantic analysis, conversion of input programs to an intermediate representation, code optimization and code generating, etc. In some embodiments, the compiler 216 may translate source code from a high-level programming language to a lower level language (e.g., bytecode, assembly language, object code, or machine code) to create an intermediate or executable program.

In embodiments where the data processing procedure 212 is offloaded to the storage device 110 in source code form, the compiler 216 may be unnecessary since the host device 106 directly sends the source code of data processing procedure 212 to the storage device.

The data processing offloader 218 comprises software that controls the offloading of the data processing procedure 212 from the host device 106 to the storage device 110 for execution by the storage device. In some embodiments, the data processing procedure 212 may already be stored on the storage device 110 in compiled form and may be invoked by the data processing offloader 218 as needed. In some embodiments, the data processing offloader 218 may offload the data processing procedure 212 by communicating with other components of the host device 106. For instance, the data processing offloader 218 may communicate with the compiler 216 to determine whether the data processing procedure 212 is present and ready to offload to the storage device 110.

The data processing offloader 218 may execute a predefined set of commands to perform various operations for controlling the offloading of the data processing procedure 212. In some embodiments, the data processing offloader 218 may support the following set of commands:

1. LOAD PROCEDURE—Loads the data processing procedure 212 from specified program 210 and returns ID of it (PROC_ID).
2. UNLOAD PROCEDURE—Unloads the data processing procedure 212 with specified PROC_ID.
3. RUN PROCEDURE—Runs the data processing procedure 212 with specified PROC_ID and parameters. Returns ID of the running instance (RUN_ID). The procedure continues running in the background until it is finished or aborted by the ABORT PROCEDURE command. In the former case, the data processing offloader 218 polls the storage device 110 for progress via the POLL PROCEDURE command.
4. POLL PROCEDURE—Polls if the data processing procedure 212 with specified RUN_ID is still running or finished. Returns either progress %, if the procedure is still running, or return code and output parameters, if it has finished.
5. ABORT PROCEDURE—Aborts execution of the data processing procedure 212 with specified RUN_ID on the storage device 110.

Figure 3:
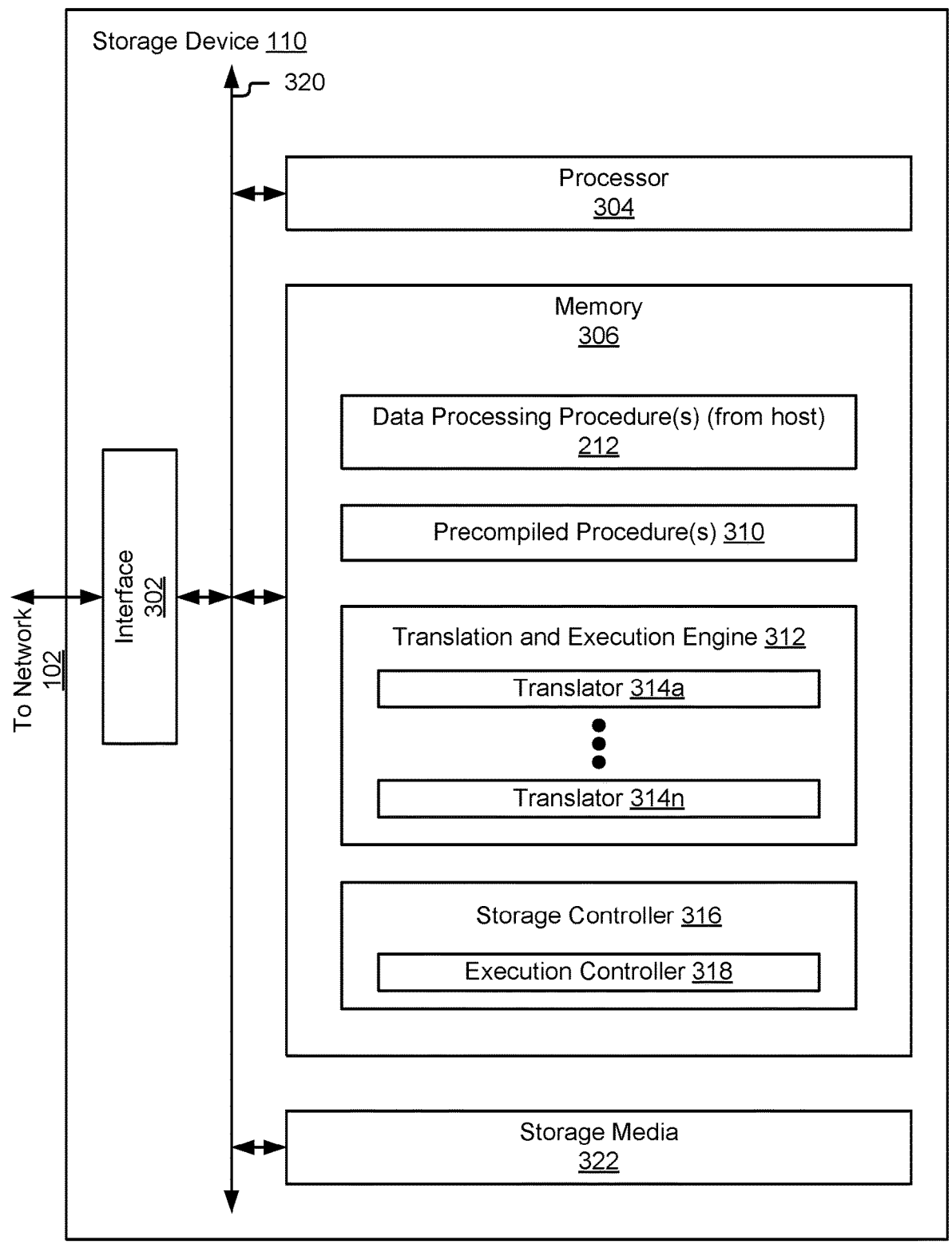
FIG. 3 is a block diagram of an example storage device included in the data processing system of FIG. 1.

FIG. 3 is a block diagram of an example storage device 110 included in the data processing system 100 of FIG. 1. As shown, the storage device 110 may comprise, among other components, an interface 302, a processor 304, storage media 322, and a memory 306 for storing software and data, including one or more data processing procedures 212, one or more precompiled procedures 310, translation and execution engine 312, and a storage controller 316. However, it should be understood that the storage device 110 may include alternative, less, and/or additional components depending on the configuration, such as configurations omitting precompiled procedures 310, combining elements, implementing elements in hardware vs. software, etc. The components of the storage device 110, including the interface 302, the processor 304, the storage media 322 and the memory 306 are coupled to each other using a bus 320, which transfers data between these components.

The interface 302, the processor 304, and the memory 306 of the storage device 110 may comprise physical components that have the same or similar characteristics and/or attributes to the interface 202, the processor 204, and the memory 206 of the host device 106, respectively, as described above with respect to FIG. 2, and as such, the description of those components is not repeated here.

The storage media 322 provides physical storage of data and may comprise one or more flash memory devices, magnetic disks, optical disks, or any type of non-volatile storage media suitable for storing data. The data may be accessed in the storage media 322 as files, blocks, or objects depending on the type of storage device 110.

The memory 306 may store programs and/or data that are executed by the processor 304. As shown in FIG. 3, the memory 306 may contain one or more programs including the data processing procedure(s) 212 received from the host device 106, the precompiled procedure(s) 310, the translation and execution engine 312, and/or the storage controller 316, although it should be understood that further combinations and/or types of data and/or programs may be stored depending on the embodiment, such as but not limited to ones omitting the precompiled procedure(s) 310.

In some embodiments, the memory 306 may contain the precompiled procedures 310 preloaded into the memory 306 in machine code format. The precompiled procedures 310 form a preexisting library of data processing procedures for performing commonly occurring functions for data stored on the storage device 110, such as compression, encryption or decryption. In some embodiments, the precompiled procedure(s) 310 may be stored in the memory 306 implemented using a software container. It should be understood that a software container may include a secure runtime environment that manages the execution of a binary (i.e., machine code) using sandboxing or other data security techniques.

The translation and execution engine 312 may logic (e.g., software, firmware, etc.) executed by the processor 304 that manages translation and execution of the received data processing procedure 212 by the storage device 110.

The translation and execution engine 312 includes one or more translators 314a, . . . , 314n that translates the source code or bytecode instructions of the data processing procedure 212 so that they can be subsequently executed by the processor 304. The translator(s) 314 may comprise one or more compilers, one or more interpreters, or some combination of the two. In some embodiments, as described in more detail with respect to FIG. 7 below, the translator 314 optimizes the translation and execution of the data processing procedure 212 by the storage device 110 for purposes of improving the performance and/or security of the storage device 110 in performing the data processing offload task. The standard and generally known aspects of translators are incorporated herein by reference and are not further described herein.

In some embodiments, the translator 314 may comprise a compiler for compiling source code or bytecode in the data processing procedure 212, as described in more detail with respect to FIG. 6A below. For instance, the translator 314 may be a just-in-time (JIT) compiler. The JIT compiler 314 may allow compilation performed during execution of a program at run time rather than prior to execution. JIT compilation, by combining the speed of compiled code with the flexibility of interpretation, thus provides an advantage during execution.

In some embodiments, the translator 314 may be an interpreter that executes received source code or bytecode in the data processing procedure 212, as described in more detail with respect to FIG. 6B below. For instance, in an example embodiment, the translator 314 may be a Java bytecode interpreter that interprets Java bytecode, although it should be understood that a translator 314 may be configured to interpret any suitable bytecode language. In this example, the Java bytecode interpreter may include a subprogram called Bytecode Verifier that verifies and ensures that the received bytecode do not violate defined security rules, thus making the data processing system 100 much more secure. The Java bytecode interpreter may also include a subprogram Execution Engine that converts verified bytecodes into machine code for execution.

The storage controller 316 may include software or firmware executed by the processor 304 that controls the operation of the storage device 110, including reading data from or writing data to the storage media 322, input/output functions, garbage collection, etc. The storage controller 316 may be operatively coupled to the other components of the storage device 110 including the processor 304, the translation and execution engine 312, the storage media 322 and the interface 302 so as to perform these functions.

In some embodiments, the storage controller 316 may include controller logic that transfers requests from the translation and execution engine 312 to the storage media 322 by converting the requests to an internal physical address of the storage media 322. In some embodiments, the storage controller 316 may implement functions that permit compressed data access in addition to or in the alternative to uncompressed data access.

The execution controller 318, which may be part of the storage controller 316 (as shown in FIG. 3), may be part of a separate component, or comprise an independent component, controls the receiving, translating, executing, and releasing of the data processing procedure 212 by the storage device 110. In some embodiments, the execution controller 318 may determine an order for a queue of the data processing procedure(s) 212 if there is more than one data processing procedure stored in the memory 306.

In some embodiments, the execution controller 318 may determine and select a specific translator 314 (i.e., compiler or interpreter) in the translation and execution engine 312 to be used for translating and executing the data processing procedure 212 based on a variety of different factors, including the instruction type (i.e., source code or bytecode) of the data processing procedure 212. In some embodiments, the execution controller 318 may determine the instruction type of the data processing procedure 212 based on a command received from the host device 106, and based on the determined instruction type to select the translator 314 to be used to execute the data processing procedure 212. In some embodiments, the execution controller 318 may directly check the data processing procedure 212 itself to determine which kind of translator to be used for translating and executing the data processing procedure 212. For instance, the execution controller 318 may check the header of the data processing procedure 212 or metadata associated with the procedure to select the translator 314.

In the above description, the data processing procedure(s) 212, the precompiled procedure(s) 310, the translation and execution engine 312, and the storage controller 316 are implemented as software programs that are executed by the processor 304. However, in further embodiments, one or more of the data processing procedure(s) 212, the precompiled procedure(s) 310, the translation and execution engine 312, and the storage controller 316 may be implemented in one or more hardware logic devices, such as ASICs, FPGAs, etc.

Figure 4:
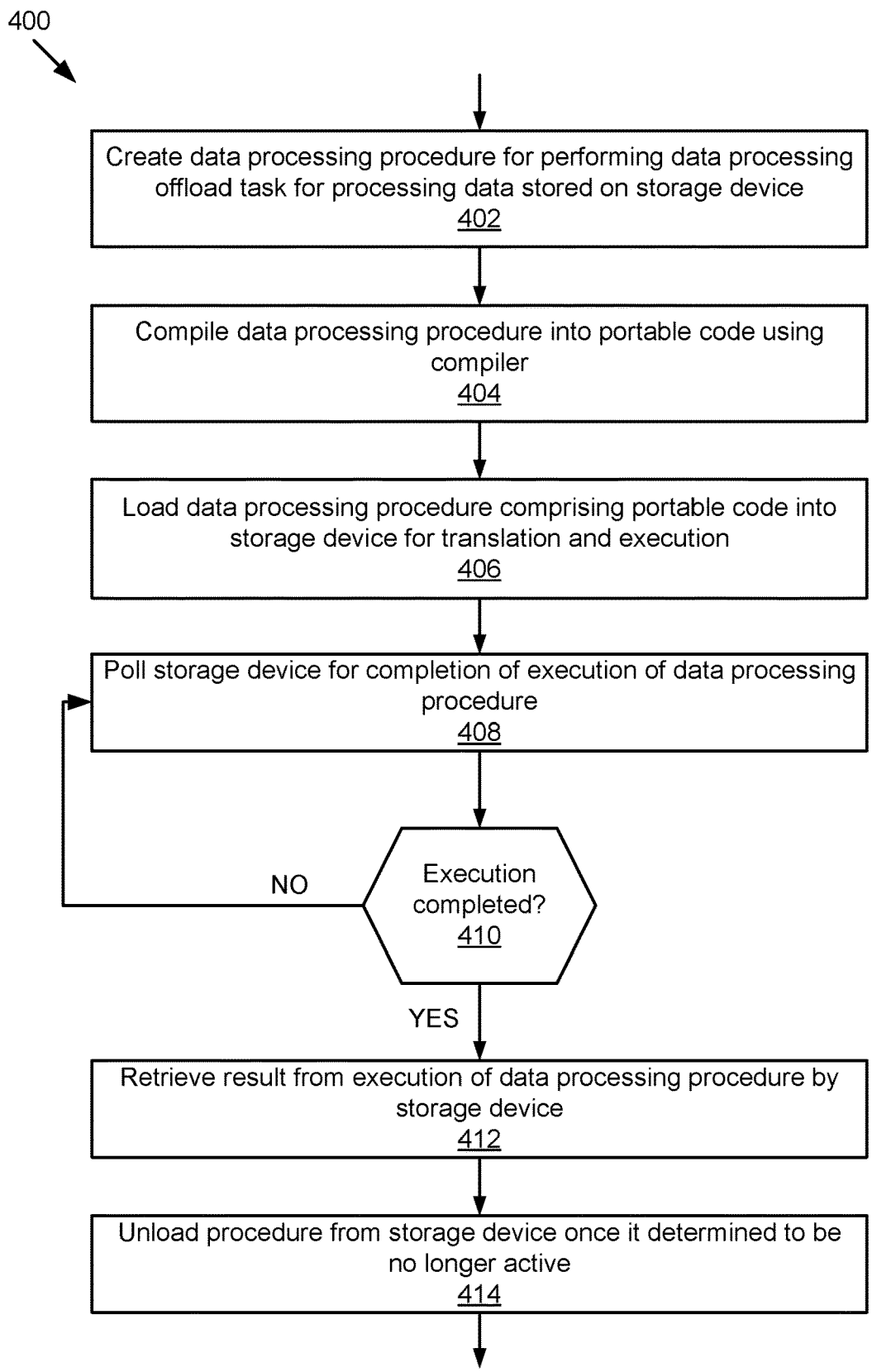
FIG. 4 is a flowchart of an example method for performing data processing offload by the host device of FIG. 2.

FIG. 4 is a flow chart of an example method 400 for offloading data processing, such as by the host device 106 to a storage device 110. In block 402, as described in more detail above with respect to FIG. 2, a data processing procedure 212 is created for performing a data processing offload task for processing one or more specified items of data stored on the storage device 110.

In block 404, the compiler 216 compiles the data processing procedure 212 from source code into bytecode and stores the bytecode into the memory 206. In some embodiments, the operations in block 404 may be performed when the host device 106 sends the data processing procedure 212 to the storage device 110 in bytecode form, and may be omitted in various embodiments where data processing procedure(s) 212 are sent in forms other than bytecode.

In block 406, the data processing offloader 218 of the host device 106 loads the data processing procedure 212 into the storage device 110 for translation and execution. The loaded data processing procedure 212 may comprise portable code that may be source code without compilation, or bytecode that is compiled by the compiler 216. In some embodiments, the data processing offloader 218 may perform block 406 by issuing a LOAD PROCEDURE command to the storage device 110. During this block, the data processing offloader 218 may generate an identifier (e.g., PROC_ID) that uniquely identifies the loaded procedure 212. In some embodiments, the data processing offloader 218 may load data identifiers to be processed by the data processing procedure 212. In embodiments where the storage device 110 employs block storage, the data identifiers may be logical block addresses for the data. In embodiments where the storage device 110 employs object storage, the identifiers may be globally unique identifiers that identify the objects to be processed. In either embodiment, the identifiers also indicate which storage device 110 the data processing procedure 212 should be loaded to. Other suitable data identifiers are also possible and contemplated.

In block 408, the data processing offloader 218 may poll the storage device 110 to periodically check the progress of execution of the offloaded procedure 212 on the storage device 110. In further embodiments in which polling is omitted or executed less frequently, the operations in block 408 may be omitted or performed less frequently. In some embodiments, the data processing offloader 218 may perform block 408 by issuing a POLL PROCEDURE command to the storage device 110. Based on the response from the storage device 110 to the POLL PROCEDURE command, the data processing offloader 218 may determine whether the execution of the data processing procedure 212 is completed in block 410. If not, the data processing offloader 218 may repeat the block 408 by issuing another command to check progress until the execution is completed. In some embodiments, as an alternative to polling the storage device 110 may use Asynchronous Event Requests provided by the NVMe protocol to deliver procedure execution completion information to the host device 106.

In block 412, in some embodiments, once execution of the data processing procedure 212 is completed, the data processing offloader 218 may retrieve the result(s), if any, returned from execution of the data processing procedure 212 by the storage device 110, although in further embodiments, the data processing offloader 218 may forgo the data retrieval in block 412 at this point, and proceed to other operations, such as those in block 414.

In block 414, the data processing offloader 218 may unload the data processing procedure 212 from the storage device 110 once it is determined that it is no longer active (e.g., will no longer be used by the storage device). In some embodiments, the data processing offloader 218 may determine whether or not the data processing procedure 212 should continue to be used based on the completion status obtained in block 410 and/or on other procedures processed (already, currently, in the future) in the storage device 110. In some embodiments, the data processing offloader 218 may perform block 414 by issuing an UNLOAD PROCEDURE command to the storage device 110, specifying the PROC_ID of the specific data processing procedure 212 to be unloaded.

FIG. 5 is a flowchart of an example method for performing a data processing offload task. In block 502, the storage controller 316 may receive a data processing procedure 212 comprising portable code for performing a data processing offload task for processing one or more items of data stored on a storage device 110. In some embodiments, block 502 may be performed in response to the issuance of the LOAD PROCEDURE command by the host device 106. In some embodiments, the received data processing procedure 212 may be a standalone procedure that can itself perform the data processing task. In some embodiments, the received data processing procedure 212 may be offloaded as a component of a library of procedures linked together to perform the expected data processing task. In some embodiments, the operations in block 502 may be skipped.

In block 504, the execution controller 318 selects a translator 314 (i.e., compiler or interpreter) in the translation and execution engine 312 to be used for translating the portable code of the data processing procedure 212. The execution controller 318 may select the translator 314 based on a number of factors, including the configuration of the storage device 110, the portable code itself, and types and a number of the data processing tasks. In some embodiments, the execution controller 318 may select the translator 314 by determining a type (i.e., source code or bytecode) of the received portable code of the data processing procedure 212. In some embodiments, the execution controller 318 may select the translator 314 based on information contained in the LOAD PROCEDURE command associated with the data processing procedure 212, a header in the data processing procedure 212, a metadata tag in the data processing procedure 212, etc. The execution controller 318 routes the data processing procedure 212 to the selected translator 314. In some embodiments, a single translator 314 may be available for application, or the translator 314 to be used may be predetermined, in which case the determination of which translator 314 may be simplified and/or the operations for selecting which translator to use may be skipped.

In block 506, the translator 314 translates and executes the data processing procedure 212 using the translation and execution engine 312. Based on the type of the selected translator 314, which may in some cases include a compiler or translator as described elsewhere herein, the translation and execution engine 312 may either compile or interpret the received data processing procedure 212, as described below with respect to FIGS. 6A and 6B. In some embodiments, during the translation and execution process in block 506, the translation and execution engine 312 may perform one or more execution optimization operations as described below with respect to FIG. 7.

In block 508, the execution controller 318 may periodically check the progress of execution of the data processing procedure 212. The execution controller 318 may communicate with the corresponding translation and execution engine 312 to check if the execution is completed. If not, the execution controller 318 may periodically check the progress again until the execution is completed.

In block 510, in some embodiments, the storage controller 316 may send the result(s), if any, from the execution of the data processing procedure 212 by the translation and execution engine 312 to the host device 106. For instance, for the first example procedure 212 as described above with respect to FIG. 2, the execution of the data processing procedure 212 may return a result indicating the number of records containing the word "cat" in the specified data set. In further embodiments, the result(s) may be sent at a later point in time or not at all depending on the configuration. In some cases, a confirmation code may be sent in lieu of the results, or may be included in the results, to reflect the outcome and/or status of the processing.

In block 512, the storage controller 316 may release the data processing procedure 212 from the storage device 110 when it is no longer active (e.g., will no longer be used by the storage device). In some embodiments, block 512 may be performed in response to the issuance of the UNLOAD PROCEDURE command by the host device 106. The release of the data processing procedure 212 may free up space in the memory 306, thus improving the efficiency of the limited resources in the storage device 110.

Figure 6A:
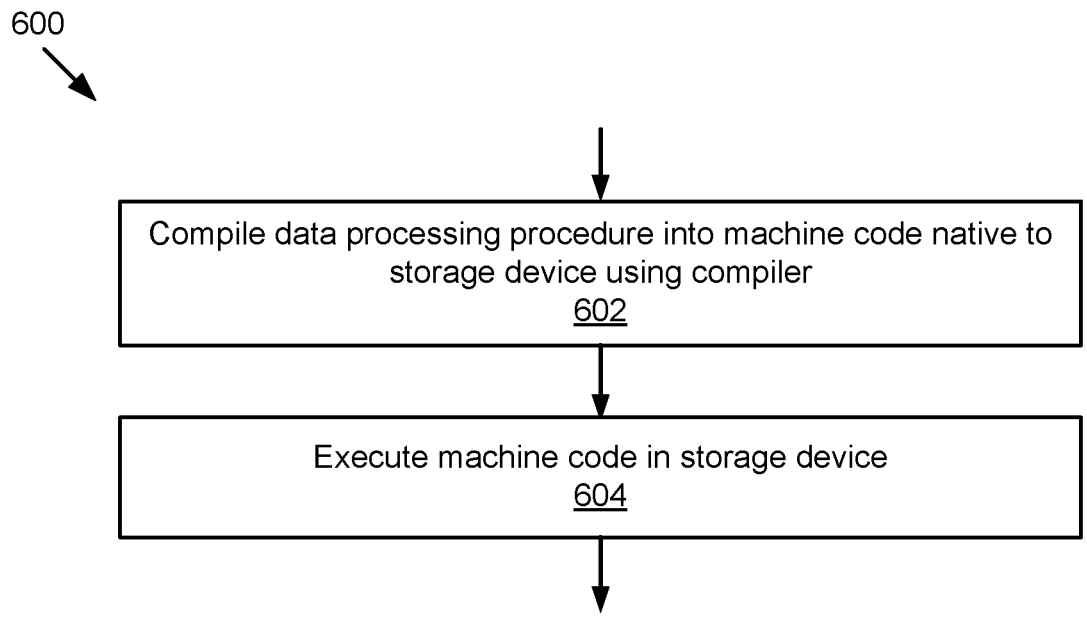
FIG. 6A is a flowchart of an example method for performing the translate and execute portable code block of FIG. 5 in which the translator is a compiler.

FIG. 6A is a flowchart of an example method 600 for translating and executing a data processing procedure where the translator 314 is a compiler. The method 600 represents an example of the processing that may be performed in block 506 of FIG. 5. In block 602, the compiler 314 compiles the data processing procedure 212 into machine code native to the storage device 110 and stores the machine code into the memory 306. In block 604, the translation and execution engine 312, in conjunction with the processor 304 and storage controller 316, executes the compiled machine code for execution of the data processing task. The aspects of a compiler that are standard and known are incorporated by reference and not described in further detail herein.

Figure 6B:
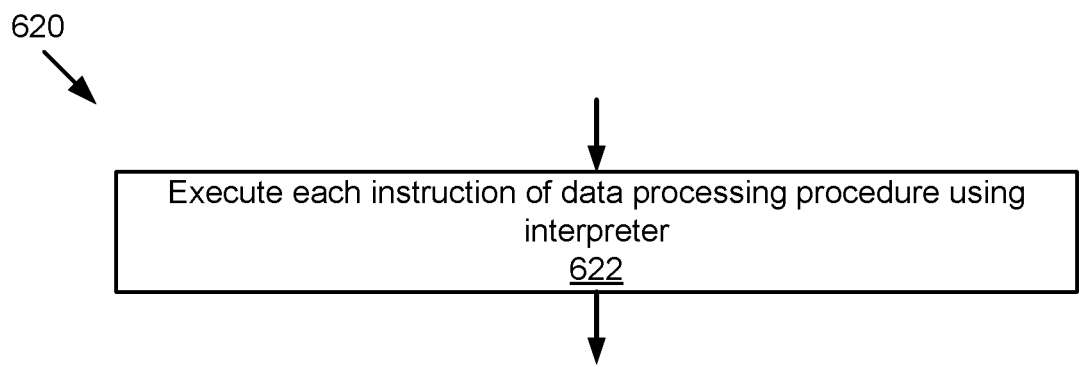
FIG. 6B is a flowchart of an example method for performing the translate and execute portable code block of FIG. 5 in which the translator is an interpreter.

FIG. 6B is a flowchart of an example method 620 for translating and executing a processing procedure where the translator 314 is an interpreter. The method 600 represents an example of the processing that may be performed in block 506 of FIG. 5. In block 622, the translation and execution engine 312 parses and executes each instruction of the data processing procedure 212 using the interpreter 314. The interpreter 314 may include a source code interpreter, a bytecode interpreter, or multiple source code interpreters and/or bytecode interpreters, depending on the particular embodiment. In some embodiments, the selected interpreter 314 may depend on the type of code. For instance, the selected interpreter 314 may be determined based on whether the data processing procedure 212 to be interpreted comprises source code or bytecode. In many typical scenarios, a bytecode interpreter is significantly simpler and more efficient than a source code interpreter. The aspects of an interpreter that are standard and known are incorporated by reference and not described in further detail herein.

Figure 7:
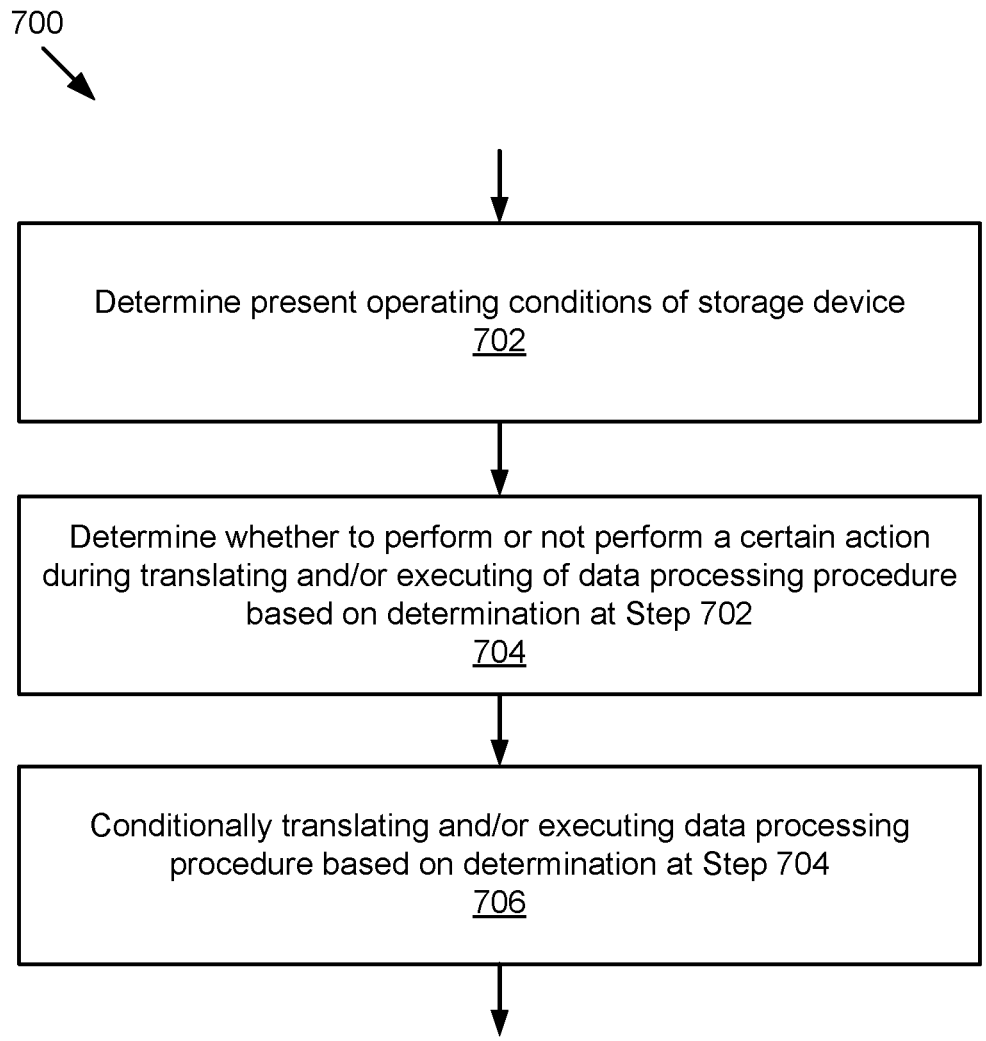
FIG. 7 is a flowchart of an example method for performing the translate and execute portable code block of FIG. 5 that optimizes the performance and/or security of the storage device.

FIG. 7 is a flowchart of an example method 700 for translating and executing a data processing procedure that optimizes the performance and/or security of the storage device 110. The method 700 represents an example of the processing that may be performed in block 506 of FIG. 7. In block 702, the translation and execution engine 312 and a corresponding translator 314 may determine a present operating condition of the storage device 110 during the translating and executing operations (e.g., including interpretation, compilation and/or execution of the data processing procedure 212). For example, the present operating condition of the storage device 110 may include backlogs or garbage collection activities being performed by the storage controller 316 of the storage device 110.

In block 704, the translation and execution engine 312 may determine whether to perform or to not perform a certain action during the translating and executing block based on the determination at block 702. In the above example, the translation and execution engine 312 may determine that the execution of the data processing procedure 212 by the storage device 110 should be temporarily stopped to allow the garbage collection activity to proceed.

In block 706, the translation and execution engine 312 may conditionally perform the translating and executing operations based on the determination in block 704. Block 706 may be performed in a manner that optimizes the performance of the data processing offload task by the storage device 110. In the above example, the translation and execution engine 312 may generate an exception to stop the execution of the data processing procedure 212 by the storage device 110 and allow the garbage collection activity to proceed. Once the garbage collection activity has completed, the translation and execution engine 312, may, in some cases, allow the data processing procedure 212 to resume execution from exactly the same point at which it was stopped, thereby avoiding having to restart execution of the procedure from the beginning of the procedure.

As seen in the above example, in some embodiments the performance of the storage device 110 may be improved by balancing the execution of the data processing procedure 212 against other activities concurrently being performed by the storage device 110. In embodiments with an interpreter, the efficiency of the translate and execute process may be improved by, for instructions in the data processing procedure 212 that have been previously interpreted, executing the previously generated machine code rather than interpreting the same instructions again.

In some embodiments, the security of the performance of the data processing procedure 212 may be improved. For example, as discussed above with respect to FIG. 3 the translator 314 (e.g., a Java bytecode interpreter) may include a subprogram that verifies and ensures that the received source code and/or bytecode do not violate defined security rules, thus making the data processing system 100 much more secure.

Systems and methods for offloading data processing tasks using in-storage code execution are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage system, comprising:
a host device comprising:
one or more processors; and
a data processing offloader logic executable by the one or more processors to perform operations comprising:
creating a data processing procedure to perform a data processing offload task in a storage device configured to be coupled to the host device, wherein the storage device comprises:
a non-transitory storage medium; and
a storage controller configured to execute the data processing offload task using data stored in the non-transitory storage medium;
compiling the data processing procedure into a portable code configured to be loaded into the storage device, wherein the portable code comprises one or more translatable, hardware-agnostic instructions for processing data stored on the non-transitory storage medium of the storage device;
loading the portable code into the storage device for translation and execution of the portable code by the storage device;
detecting whether the execution of the portable code by the storage device has completed; and
responsive to detecting that the execution of the portable code has completed, unloading the portable code from the storage device.

2. The data storage system of claim 1, wherein detecting whether the execution of the portable code by the storage device has completed comprises:
polling the storage device to periodically check a progress of the execution of the portable code by the storage device; and
receiving a status of the execution of the portable code from the storage device.

3. The data storage system of claim 1, wherein responsive to detecting that the execution of the portable code has completed, receiving a result of the execution of the portable code from the storage device.

4. The data storage system of claim 1, wherein loading the portable code into the storage device comprises generating an identifier uniquely identifying the loaded portable code.

5. The data storage system of claim 1, wherein loading the portable code into the storage device comprises invoking the portable code previously stored in a precompiled format on the storage device.

6. The data storage system of claim 1, wherein loading the portable code into the storage device comprises loading one or more identifiers uniquely identifying data to be processed on the non-transitory storage medium of the storage device.

7. The data storage system of claim 1, wherein:
the data processing offloader logic skips compiling source code instructions of the data processing procedure; and
the one or more translatable, hardware-agnostic instructions of the portable code comprise the source code instructions.

8. The data storage system of claim 1, wherein:
the data processing offloader logic compiles source code instructions of the data processing procedure into bytecode instructions;
the one or more translatable, hardware-agnostic instructions of the portable code comprise the bytecode instructions; and
the bytecode instructions are specifically configured to perform data processing offload tasks.

9. The data storage system of claim 1, wherein the translation of the portable code by the storage device comprises compiling the one or more translatable, hardware-agnostic instructions of the portable code into machine code native to the storage device.

10. The data storage system of claim 1, wherein the data processing offload task comprises:
performing one of a MapReduce, counting, filtering, compaction, and encryption type of operation on one or more items of data stored on the non-transitory storage medium of the storage device.

11. The data storage system of claim 1, further comprising:
the storage device comprising:
one or more second processors;
the non-transitory storage medium; and
a storage controller logic executable by the one or more second processors to perform operations comprising:
receiving, from the host device, the portable code;
translating and executing the one or more translatable, hardware-agnostic instructions of the portable code to perform the data processing offload task in the storage device using a translation and execution engine disposed in the storage controller logic; and
sending to the host device an indication of a status of the data processing offload task in the storage device.

12. A method, comprising:
creating, by a host device, a data processing procedure to perform a data processing offload task in a storage device configured to be coupled to the host device, wherein the storage device comprises:
a non-transitory storage medium; and
a storage controller configured to execute the data processing offload task using data stored in the non-transitory storage medium;
compiling, by the host device, the data processing procedure into a portable code configured to be loaded into the storage device, wherein the portable code comprises one or more translatable, hardware-agnostic instructions for processing data stored on the non-transitory storage medium of the storage device;
loading, by the host device, the portable code into the storage device for translation and execution of the portable code by the storage device;
detecting, by the host device, whether the execution of the portable code by the storage device has completed; and
responsive to detecting that the execution of the portable code has completed, unloading, by the host device, the portable code from the storage device.

13. The method of claim 12, wherein detecting whether the execution of the portable code by the storage device has completed comprises:
polling the storage device to periodically check a progress of the execution of the portable code by the storage device; and
receiving a status of the execution of the portable code from the storage device.

14. The method of claim 12, wherein responsive to detecting that the execution of the portable code has completed, receiving a result of the execution of the portable code from the storage device.

15. The method of claim 12, wherein loading the portable code into the storage device comprises generating an identifier uniquely identifying the loaded portable code.

16. The method of claim 12, wherein loading the portable code into the storage device comprises invoking the portable code previously stored in a precompiled format on the storage device.

17. The method of claim 12, wherein loading the portable code into the storage device comprises loading one or more identifiers uniquely identifying data to be processed on the non-transitory storage medium of the storage device.

18. A data storage system, comprising:
a host device;
a storage device configured to be coupled to the host device and including:
a non-transitory storage medium; and
a storage controller configured to execute a data processing offload task using data stored in the non-transitory storage medium;
means for creating a data processing procedure to perform the data processing offload task in the storage device;
means for compiling the data processing procedure into a portable code configured to be loaded into the storage device, the portable code comprising one or more translatable, hardware-agnostic instructions for processing data stored on the non-transitory storage medium of the storage device;
means for loading the portable code into the storage device for translation and execution of the portable code by the storage device;
means for detecting whether the execution of the portable code by the storage device has completed; and
means for unloading the portable code from the storage device responsive to detecting that the execution of the portable code has completed.

* * * * *